(12) United States Patent
Horesh (10) Patent No.: US 10,142,553 B2
(45) Date of Patent: Nov. 27, 2018

(54) CAMERA AND LIGHT SOURCE SYNCHRONIZATION FOR OBJECT TRACKING

(71) Applicants: INTEL CORPORATION, Santa Clara, CA (US); Nizan Horesh, Caesarea (IL)

(72) Inventor: Nizan Horesh, Caesarea (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,649

(22) PCT Filed: Sep. 16, 2013

(86) PCT No.: PCT/US2013/059969
§ 371 (c)(1),
(2) Date: Dec. 27, 2013

(87) PCT Pub. No.: WO2015/038160
PCT Pub. Date: Mar. 19, 2015

(65) Prior Publication Data
US 2016/0219208 A1  Jul. 28, 2016

(51) Int. Cl.
*H04N 5/235* (2006.01)
*H04N 5/232* (2006.01)
(Continued)

(52) U.S. Cl.
CPC .......... *H04N 5/2354* (2013.01); *G03B 15/05* (2013.01); *G03B 17/38* (2013.01); *G06F 3/013* (2013.01);
(Continued)

(58) Field of Classification Search
None
See application file for complete search history.

(56) References Cited

U.S. PATENT DOCUMENTS

| 7,646,422 B2 * | 1/2010 | Kisacanin | A61B 3/113 348/370 |
| 8,488,895 B2 * | 7/2013 | Muller | G02B 21/0028 351/206 |

(Continued)

FOREIGN PATENT DOCUMENTS

| EP | 1562469 B1 | 5/2009 |
| KR | 1020020073747 A | 9/2002 |
| KR | 1020120059959 A | 6/2012 |

OTHER PUBLICATIONS

Bradley, Derek, et al. "Synchronization and rolling shutter compensation for consumer video camera arrays." 2009 IEEE Computer Society Conference on Computer Vision and Pattern Recognition Workshops. IEEE, 2009.*

(Continued)

*Primary Examiner* — Mohammad J Rahman
(74) *Attorney, Agent, or Firm* — Barnes & Thornburg LLP (57) ABSTRACT

Technologies for camera and light source synchronization include an imaging device to detect a current location of an object in a captured image generated by the imaging device. The imaging device predicts a next location of the object in a next captured image, generated by the imaging device, based on the current location of the object. The imaging device determines an illumination interval defining a period of time during which a camera of the imaging device is to expose a set of sensor lines during the capturing of the next captured image and activates a light source of the imaging device to illuminate the object during the determined illumination interval. The set of sensor lines corresponds with the predicted next location of the object.

25 Claims, 6 Drawing Sheets

(51) Int. Cl.
*H04N 5/225* (2006.01)
*G06F 3/01* (2006.01)
*G06K 9/00* (2006.01)
*G03B 15/05* (2006.01)
*G03B 17/38* (2006.01)

(52) U.S. Cl.
CPC ....... *G06K 9/00604* (2013.01); *H04N 5/2256* (2013.01); *H04N 5/2329* (2013.01); *H04N 5/2353* (2013.01); *H04N 5/23219* (2013.01); *G06K 9/00221* (2013.01)

(56) References Cited

U.S. PATENT DOCUMENTS

| | | | | |
|---|---|---|---|---|
| 2004/0101296 | A1* | 5/2004 | Nakata | G03B 7/08 396/65 |
| 2007/0182818 | A1* | 8/2007 | Buehler | G08B 13/19602 348/143 |
| 2008/0198039 | A1* | 8/2008 | Philiben | G08G 5/0008 340/961 |
| 2008/0211916 | A1* | 9/2008 | Ono | G08B 13/19608 348/164 |
| 2009/0160957 | A1* | 6/2009 | Deng | G06T 7/2026 348/208.99 |
| 2009/0201383 | A1* | 8/2009 | Slavin | H04N 5/23248 348/222.1 |
| 2010/0077421 | A1* | 3/2010 | Cohen | G07C 9/00158 725/10 |
| 2011/0001859 | A1* | 1/2011 | Matsuura | H04N 5/2354 348/296 |
| 2011/0187859 | A1* | 8/2011 | Edelson | H04N 5/353 348/143 |
| 2011/0187878 | A1* | 8/2011 | Mor | G02B 27/0983 348/218.1 |
| 2012/0062845 | A1* | 3/2012 | Davis | G03B 9/08 352/45 |
| 2012/0092559 | A1* | 4/2012 | Ubillos | H04N 19/86 348/607 |
| 2012/0120241 | A1 | 5/2012 | Lewis et al. | |
| 2012/0154630 | A1* | 6/2012 | Pinto | H04N 5/235 348/226.1 |
| 2012/0262599 | A1 | 10/2012 | Brunner | |
| 2012/0270571 | A1 | 10/2012 | Biller et al. | |
| 2012/0307084 | A1* | 12/2012 | Mantzel | H04N 5/23248 348/208.2 |
| 2012/0307085 | A1* | 12/2012 | Mantzel | H04N 5/2329 348/208.4 |
| 2013/0010087 | A1* | 1/2013 | Nieten | H04N 5/238 348/50 |
| 2013/0044230 | A1* | 2/2013 | Zhou | H04N 5/2329 348/208.6 |
| 2013/0044241 | A1* | 2/2013 | Zhou | H04N 5/23258 348/241 |
| 2013/0101155 | A1 | 4/2013 | Jelinek et al. | |
| 2013/0126713 | A1* | 5/2013 | Haas | H04B 10/116 250/208.2 |
| 2014/0028861 | A1* | 1/2014 | Holz | H04N 5/23277 348/208.4 |
| 2014/0232867 | A1* | 8/2014 | Xing | H04N 5/2353 348/144 |
| 2015/0301328 | A1* | 10/2015 | Gonzaga | G02B 21/365 348/79 |
| 2015/0323311 | A1* | 11/2015 | Muijs | G01B 11/612 356/28.5 |

OTHER PUBLICATIONS

International Search Report and Written Opinion received for PCT Patent Application No. PCT/US2013/059969, dated Jun. 11, 2014, 10 pages.
Wikipedia.org, "Rolling shutter," Wikipedia, the Free Encyclopedia, retrieved from: <http://en.wikipedia.org/w/index.php?title=Rolling_shutter&oldid=548756922>, edited Apr. 5, 2013, 3 pages.
Motion Video Products, "Rolling vs Global Shutter," retrieved from: <http://www.motionvideoproducts.com/MVP%20papers/Rolling%20vs%20Global%20Shutter.pdf>, Mar. 3, 2009, 7 pages.
European Search Report for Application No. 13893543.2-1902/3017641, dated Feb. 8, 2017, 8 pages.

* cited by examiner

CAMERA AND LIGHT SOURCE SYNCHRONIZATION FOR OBJECT TRACKING

CROSS REFERENCE TO RELATED APPLICATIONS

This application is a national stage entry under 35 USC § 371(b) of International Application No. PCT/US2013/059969, which was filed Sep. 16, 2013.

BACKGROUND

Remote eye and gaze tracking systems have been implemented in various applications to track a user's eye movements and/or the direction in which the user is looking. The range of such applications extends from serious (e.g., airport security systems) to playful (e.g., video game avatar renderings). Typical eye tracking systems may use various technologies to track a user's eye movements. For example, in some implementations, infrared sensors are used to detect reflections from a person's retina/cornea.

Digital cameras have become ubiquitous consumer devices, often incorporated in other digital electronic devices such as smartphones, tablets, and other computing devices. Typical digital cameras include an image sensor, such as a charge-coupled device (CCD) or a complementary metal-oxide-semiconductor (CMOS) image sensor, which may be formed by an array of individual pixel sensors. Depending on the type of digital camera, the associated image sensor may be operated in a global shutter mode or a rolling shutter mode. In a global shutter camera, the entire array of individual pixel sensors exposed and captured during the same time window. Conversely, in a rolling shutter camera, portions of the array of pixel sensors are captured at different times. However, because the entire image is not captured at the same point in time in a rolling shutter camera, the captured image may be distorted due to various phenomena. For example, rapid movement or lighting changes may result in artifacts appearing in the generated image. Additionally, the sensor readout time can be substantially longer than the ideal exposure time. However, rolling shutter cameras oftentimes benefit from improved image quality and reduced cost relative to global shutter cameras.

In operation, a rolling shutter camera captures images (e.g., as video frames) by consecutively reading out rows or columns of pixels sensors ("sensor lines") of the associated image sensor. Each sensor line is read on a sequential, rolling basis. Similarly, the sensor lines are reset on a rolling, sequential basis prior to readout. Specifically, each sensor line is reset (i.e., any stored information is discarded) a predetermined amount of time prior to the readout time for that sensor line such that each sensor line is exposed for the same amount of time following reset. The overall number of sensor lines of a given image sensor typically defines the resolution of the associated camera (i.e., a greater number of sensor lines result in a higher resolution image).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
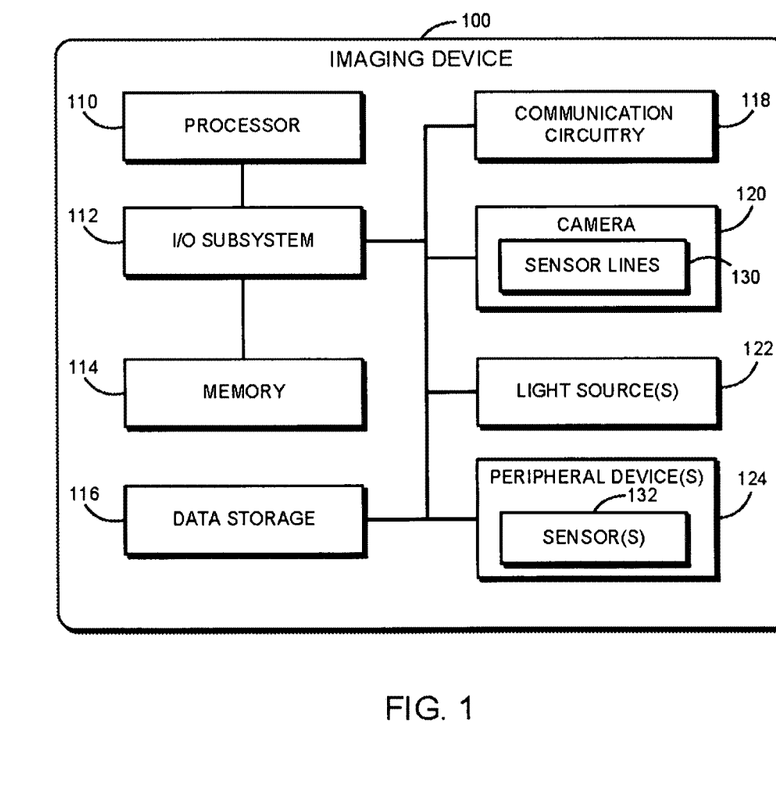
FIG. 1 is a simplified block diagram of at least one embodiment of an imaging device having camera and light source synchronization.

Referring now to FIG. 1, in the illustrative embodiment, an imaging device 100 includes a camera 120 and one or more light sources (e.g., exposure lights) 122 associated therewith. As discussed in more detail below, the camera 120 includes a plurality of sensor lines 130 and is configured to operate in a rolling shutter mode. In use, the imaging device 100 is configured to synchronize the reading/resetting of the sensor lines 130 of the camera 120 and the activation of the associated light sources 122. As discussed in detail below, such synchronization may reduce the energy consumption of the imaging device 100 associated with activation of the light sources and thereby improve the energy efficiency of the imaging device 100 because the light sources are activated only for a period required to capture the desired object (e.g., a user's eyes). In some embodiments, synchronization may also reduce the incidence of motion blur and other image artifacts and/or improve image quality at minimal or reduced cost.

The imaging device 100 may be embodied as any type of computing device capable of camera and light source synchronization and performing the functions described herein. For example, the imaging device 100 may be embodied as a stand-alone digital camera, cellular phone, smartphone, tablet computer, laptop computer, personal digital assistant, mobile Internet device, desktop computer, and/or any other computing/communication device. As shown in FIG. 1, the illustrative imaging device 100 includes a processor 110, an input/output ("I/O") subsystem 112, a memory 114, a data storage 116, a communication circuitry 118, a camera 120, one or more light sources 122, and one or more peripheral devices 124. Of course, the imaging device 100 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the imaging device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the imaging device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the imaging device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The communication circuitry 118 may be embodied as any communication circuit, device, or collection thereof, capable of enabling communications between the imaging device 100 and other remote devices over a network (not shown). To do so, the communication circuitry 118 may use any suitable communication technology (e.g., wireless or wired communications) and associated protocol (e.g., Ethernet, Bluetooth®, Wi-Fi®, WiMAX, etc.) to effect such communication depending on, for example, the type of network, which may be embodied as any type of communication network capable of facilitating communication between the imaging device 100 and remote devices.

The camera 120 may be embodied as any peripheral or integrated device suitable for capturing images, such as a still camera, a video camera, a webcam, or other device capable of capturing video and/or images. As discussed in more detail below, the camera 120 captures images of a object (e.g., a person's face or eyes) that is to be tracked. Although the illustrative imaging device 100 includes a single camera 120, it should be appreciated that the imaging device 100 may include multiple cameras 120 in other embodiments, which may be used to capture images of the object, for example, from different perspectives. As discussed above, the camera 120 is illustratively is embodied as a digital camera configured to operate in a rolling shutter mode. In the rolling shutter mode, each sensor line 130 of the camera's 120 field of view may be reset and subsequently exposed for a predetermined amount of time prior to reading the sensor line (for example, see FIG. 6). In addition to the sensor lines 130, the camera 1230 may also include one or more imaging sensors, such as infrared sensors, to capture the images. As discussed below, the captured images are analyzed for eye detection and/or gaze tracking of a subject in the field of view of the camera 120.

The light source(s) 122 may be embodied as any type of light source capable of illuminating an object being tracked by the imaging device 100. For example, in one embodiment, the light sources 122 are embodied as infrared light sources configured to project infrared light onto the tracked object (e.g., used in conjunction with infrared sensors). The light sources 122 may be configured to illuminate the entire scene (i.e., the area within the field of view of the camera 120) or, in other embodiments, to illuminate only the objects being tracked (e.g., the user's eyes) or some portion of the scene. Of course, it should be appreciated that the light sources 122 may be dedicated to image illumination in some embodiments. By illuminating the object being tracked, the camera 120 may capture a higher quality image than possible without illumination.

The peripheral devices 124 of the imaging device 100 may include any number of additional peripheral or interface devices. The particular devices included in the peripheral devices 124 may depend on, for example, the type and/or intended use of the imaging device 100. As shown in FIG. 1, the illustrative peripheral devices 124 include one or more sensors 132. The sensor(s) 132 may include any number and type of sensors depending on, for example, the type and/or intended use of the imaging device 100. The sensor(s) 132 may include, for example, proximity sensors, inertial sensors, optical sensors, light sensors, audio sensors, temperature sensors, thermistors, motion sensors, and/or other types of sensors. Of course, the imaging device 100 may also include components and/or devices configured to facilitate the use of the sensor(s) 132. For example, the imaging device 100 may include inertial sensors to detect and/or track movement of the imaging device 100 or a component of the imaging device 100. As discussed below, inertial data may be used by the imaging device 100 to make an improved estimation of the next location of the object being tracked (e.g., a subject's eyes).

Figure 2:
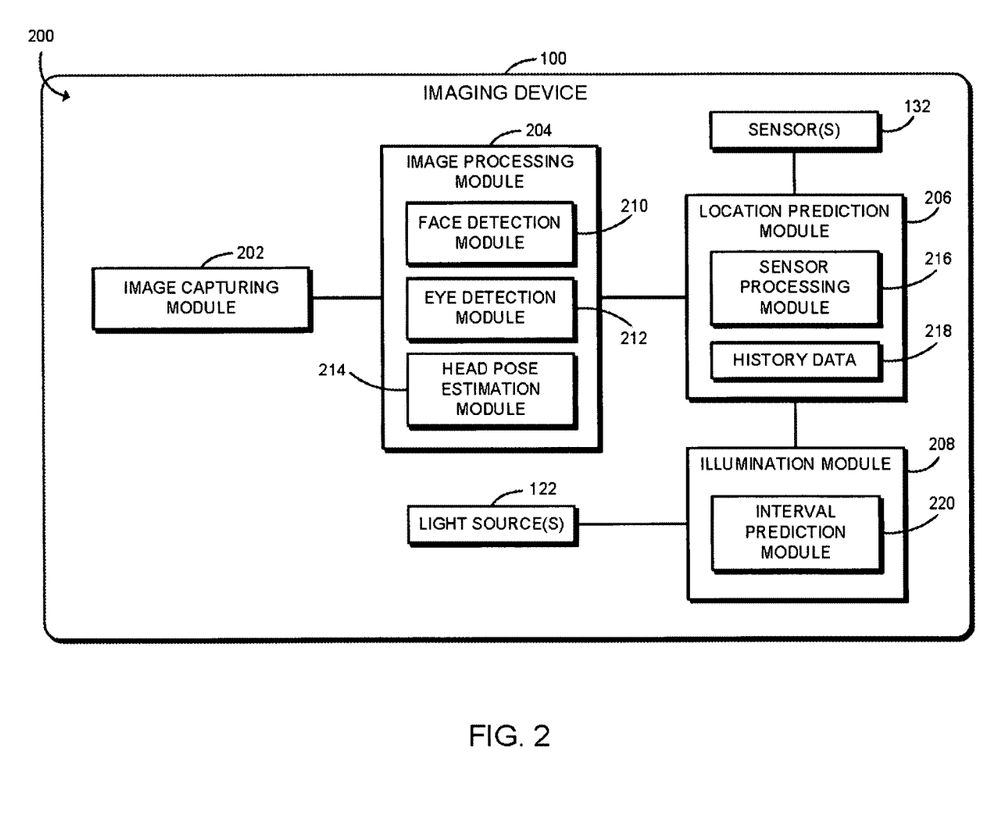
FIG. 2 is a simplified block diagram of at least one embodiment of an environment of the imaging device of FIG. 1.

Referring now to FIG. 2, in use, the imaging device 100 establishes an environment 200 for camera and light source synchronization. As discussed below, the imaging device 100 may synchronize the resetting and reading of particular sensor lines 130 of the camera 120 with the activation of the light sources 122. In doing so, the imaging device 100 may only activate the light sources 122 when a desired portion of the scene (e.g., the tracked object) is to be captured. For example, the light sources 122 may be activated when the sensor lines 130 corresponding to the desired portion of scene are to be reset and/or read by the camera 120 as discussed in more detail below.

The illustrative environment 200 of the imaging device 100 includes an image capturing module 202, an image processing module 204, a location prediction module 206, an illumination module 208, the one or more sensors 132, and the one or more light sources 122. Additionally, the image processing module 204 includes a face detection module 210, an eye detection module 212, and a head pose estimation module 214. Further, the location prediction module 206 includes a sensor processing module 216 and history data 218. As shown in the illustrative embodiment, the illumination module 208 includes an interval prediction module 220. Each of the image capturing module 202, the image processing module, the location prediction module 206, the illumination module 208, the face detection module 210, the eye detection module 212, the head pose estimation module 214, the sensor processing module 216, and the interval prediction module 220 may be embodied as hardware, software, firmware, or a combination thereof. Additionally, in some embodiments, one of the illustrative modules may form a portion of another module (e.g., the eye detection module 212 may form a portion of the face detection module 210).

The image capturing module 202 controls the camera 120 to capture images within the field of view of the camera 120. As discussed above, the camera 120 is illustratively configured to operate in a rolling shutter mode. Accordingly, the image capturing module 202 may control the parameters associated with the operation of that mode. For example, the image capturing module 202 may determine the exposure time for each sensor line 130 of the camera 120 (i.e., the amount of time between the time in which a sensor line is reset and the time in which that sensor line is read). In the illustrative embodiment, each sensor line 130 is exposed for the same amount of time on a rolling basis (see, e.g., exposure time 614 of FIG. 6).

The image processing module 204 receives the images captured with the camera 120 from the image capturing module 202 (e.g., captured as streamed video or otherwise as a collection of images/frames). As discussed in more detail below, the image processing module 204 analyzes each of the images (e.g., each frame of a streamed video or a subset thereof) to determine the location of an object to be tracked. It should be appreciated that the image processing module 204 may utilize any suitable object detection/tracking algorithm for doing so. In the illustrative embodiment, the imaging device 100 is used to track a user's eyes using camera and light source synchronization as discussed below. However, in other embodiments, the imaging device 100 may be used to track other features of the user (e.g., head positioning) and/or other objects.

As discussed above, in some embodiments, the imaging device 100 performs eye/gaze tracking of one or more persons captured in a scene. Accordingly, in some embodiments, the face detection module 210 may detect the existence of one or more person's faces in an image and determine the location of any detected faces in the captured image. Further, in some embodiments, the face detection module 210 may identify a person based on their detected face (e.g., through biometric algorithms and/or other face recognition or object correlation algorithms). As such, in embodiments in which multiple persons are tracked, the face detection module 210 may distinguish between those persons in the captured images to enhance tracking quality. Similarly, the eye detection module 212 may detect the location of a person's eyes in the captured image. It should be appreciated that in detecting the location of the object (e.g., a person's face and/or eyes), the image processing module 204 or, more specifically, the face detection module 210 and/or the eye detection module 212 may determine the sensor lines 130 of the camera 120 that correspond with the location of the object in the image. In doing so, the image processing module 204 may utilize, for example, predetermined information regarding the number, granularity, size, layout (e.g., horizontal vs. vertical), and/or other characteristics of the sensor lines 130. In some embodiments, the eye detection module 212 utilizes the location of the person's face (i.e., determined with the face detection module 210) to determine the location of the person's eyes. Of course, in other embodiments, the eye detection module 212 may make a determination of the location of the person's eyes independent of or without a determination of the location of the person's face. The head pose estimation module 214 may determine a head pose of a person based on the determined location of the person's eyes and/or face. As discussed below, the estimated head pose may be used by the location prediction module 206 (e.g., in conjunction with previous head pose estimates) to estimate motion and future location of the person's head within the captured images/video. Further, the image processing module 204 may utilize previous determinations and/or estimations of the face location, eye location, and/or head pose in order to reduce an area (i.e., a search area) of the captured image to analyze to determine a face location, eye location, and/or head pose of the person in the current image.

The location prediction module 206 estimates the location of the tracked object (e.g., a person's eyes or face) in the next captured image (e.g., a subsequent video frame). In some embodiments, the location prediction module 206 predicts the next location of the object based on sensor data and other history data 218. As such, the sensor processing module 216 may process data received from the one or more sensors 132. For example, the sensors 132 may include inertial, optical, and/or other sensors configured to detect movement of the imaging device 100, the camera 120, and/or a tracked object (e.g., a person's head, face, or eyes). The sensor processing module 216 may analyze the sensor data received from those sensors 132 using any suitable algorithm. For example, the sensor processing module 216 may determine the linear and/or angular motion of the camera 120.

The history data 218 may include data identifying previously detected or estimated locations of a person's eyes, face, head pose, or other objects/features from analyses of previous captured images. As such, it should be appreciated that the imaging device 100 may store (e.g., in the memory 114) detected and/or estimated object locations and other history data 218 for subsequent use. In some embodiments, the location prediction module 206 fuses, combines, or otherwise analyzes the sensor data in conjunction with the history data 218 to estimate the motion and/or next location of the tracked object. For example, estimates of the motion of a person's head and of the motion of the camera 120 may be used in estimating the motion and the next location of the object. Such analyses may be used to reduce the portions of the next image requiring analysis to determine the location of the object. As indicated above, the location of the object within the image corresponds with one or more sensors lines of the camera 120. Accordingly, the location prediction module 206 may determine the sensor lines 130 corresponding with the estimated location of the object in the next frame.

The illumination module 208 activates/deactivates the light source(s) 122 based on the predicted location of the tracked object in the next frame. In doing so, the interval prediction module 220 determines an illumination interval during which to activate the one or more light sources 122 during the capture of the next image based on the predicted location of the tracked object in the next image (i.e., based on the analysis of the location prediction module 206). In the illustrative embodiment, the illumination interval defines a period of time during which the camera 120 is to expose, in the next captured image, the set of sensor lines 130 (i.e., one or more sensor lines) corresponding with the predicted location of the tracked object. It should be appreciated that, in some embodiments, the sensor lines 130 are constantly exposed when they are not being read. However, as used herein, a sensor line 130 is considered to be "exposed" during the period of time occurring after the particular sensor line 130 has been reset and before the particular sensor line 130 has been read (see, e.g., exposure time 614 of FIG. 6). As such, in the illustrative embodiment, each sensor line 130 has the same exposure time, albeit occurring at a different absolute time and on a rolling, sequential basis.

As indicated above, the location prediction module 206 may determine the sensor lines 130 corresponding with the predicted location of the tracked object (e.g., a person's eyes) in the next image/frame. Accordingly, the interval prediction module 220 may determine the time interval during which those determined sensor lines 130 are scheduled to be reset and/or read. To do so, in some embodiments, the camera 120 (or the image capturing module 202) transmits a synchronization signal to the interval prediction module 220. The interval prediction module 220 may utilize the synchronization signal, one or more clocks or triggers (e.g., a pixel clock of the camera 120), parameter data of the camera 120 (e.g., exposure time, number of sensor lines, read time per sensor line, total read time, and other parameter data) and/or parameter data of the light sources (e.g., the onset time of the light source, which is the time from electrical power up to full illumination power, the time delay of the power driver, and other parameter data) to determine the time in which the relevant sensor lines 130 should be read (i.e., the illumination interval). As indicated above, the illumination module 208 activates the one or more light sources 122 during the illumination interval (see, e.g., illumination interval 616 of FIG. 6) and deactivates the light sources 122 outside the illumination interval. Of course, in some embodiments, the illumination module 208 may activate the light sources 122 for an interval greater than the illumination interval (e.g., to account for slightly erroneous estimations of the location of the object). That is, the light sources 122 may be activated during the illumination interval and during a buffer time at the beginning and/or end of that interval. In some embodiments, the image processing module 204 may analyze the captured image in order to determine which sensor lines 130 were actually illuminated by the light source 122 (e.g., due to delay between sensor line exposure and light source 122 illumination). In such embodiments, the imaging device 100 may compare the determined, actual illuminated sensor lines 130 to those sensor lines 130 intended to be illuminated during the capture of the image. If the difference between the actual and intended illuminated sensor lines 130 is greater than a reference threshold, the illumination module 208 may modify (i.e., increase or decrease) the delay time of the next illumination interval to compensate for unknown delays in the imaging device 100.

It should be appreciated that the imaging device 100 may not have any information regarding the location of the tracked object when the first image is captured. Accordingly, in some embodiments, the light sources) 122 may remain activated while capturing the entirety of the first image or first few images. The imaging device 100 may analyze those images using the mechanisms described above to determine the location of the object and estimate the next location of the object. Once the imaging device 100 has information regarding an estimated location of the object in the next image, the imaging device 100 may utilize the mechanisms described herein for camera and light source synchronization. Although the mechanisms described above are described in terms of tracking a single object, in other embodiments, the camera 120 and light sources 122 may be synchronized to track multiple objects. Additionally, in other embodiments, the imaging device 100 may utilize different criteria for determining when to commence camera and light source synchronization.

Figure 3:
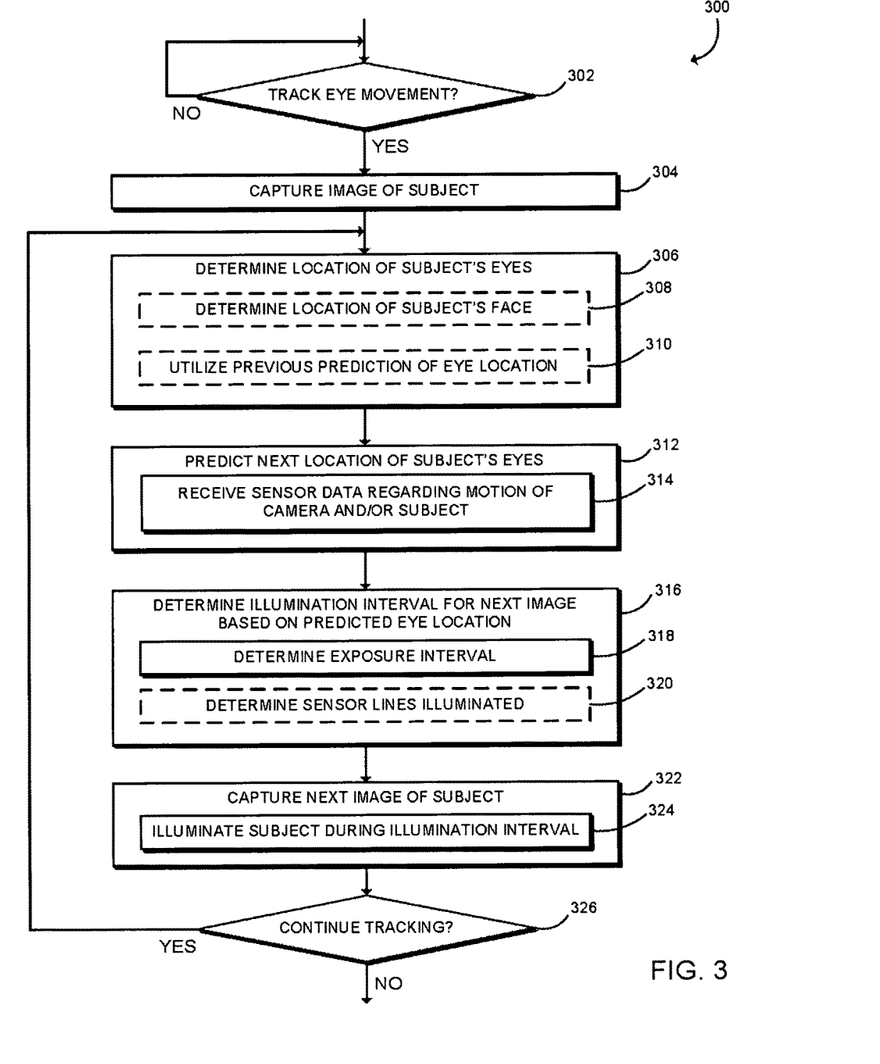
FIG. 3 is a simplified flow diagram of at least one embodiment of a method for performing camera and light source synchronization on the imaging device of FIG. 1.

Referring now to FIG. 3, in use, the imaging device 100 may execute a method 300 for camera and light source synchronization. The illustrative method 300 begins with block 302 in which the imaging device 100 determines whether to track eye movement of a person in the field of view of the camera 120. Of course, in some embodiments, the imaging device 100 may track the movement of other objects. If the imaging device 100 determines to track a subject's eye movement, the imaging device 100 captures an image of the subject in block 304. As discussed above, the imaging device 100 may capture video (e.g., in a stream) and analyze each frame/image (or a portion of the frames) of the captured video.

In block 306, the imaging device 100 determines the location of the subject's eyes in the captured image. In particular, in some embodiments, the imaging device 100 determines which sensor lines 130 of the camera 120 correspond with the location of the subject's eyes in the captured image. It should be appreciated that the imaging device 100 may use any suitable mechanism or algorithm to determine the location of the subject's eyes. In doing so, in some embodiments, the imaging device 100 determines the location of the subject's face in block 308 as discussed above. Further, in some embodiments, the imaging device 100 utilizes previous predictions of the eye location to determine the location of the subject's eyes. For example, as discussed above, the imaging device 100 may rely on previous predictions/estimations of the location of the subject's eyes to reduce a search area of the captured image.

In block 312, the imaging device 100 predicts the next location of the subject's eyes. In other words, the imaging device 100 predicts the location of the subject's eyes in the next captured image. In doing so, the imaging device 100 may receive sensor data regarding motion of the camera 120 and/or the subject. As discussed above, the imaging device 100 may utilize the sensor data to provide a more accurate estimation of the location of the subject's eyes in the next image. In block 316, the imaging device 100 determines an illumination interval for the next image based on the predicted eye location. As discussed above, in some embodiments, the illumination interval defines the period of time during which the camera 120 is to expose the set of sensor lines 130 in the next captured image corresponding with the predicted location of the subject's eyes. It should be appreciated that, in block 318, the imaging device 100 may determine the exposure interval/time for the sensor lines 130 of the camera 120 in doing so. In block 320, the imaging device 100 may also determine which sensor lines 130 were actually illuminated by the light sources 122. As discussed above, the imaging device 100 may compare the sensor lines 130 actually illuminated to the sensor lines 130 intended to be illuminated during the capture of the image. Based on that analysis, the imaging device 100 may modify the next illumination interval (e.g., by incorporating a delay).

In block 322, the imaging device 100 captures the next image of the subject. In embodiments in which the camera 120 captures video, this may entail receiving the next image frame of the video. In block 324, the imaging device 100 illuminates the subject during the illumination interval with the one or more light sources 122 during the capture of the next image. As discussed above, the light sources 122 are activated when the camera 120 is resetting and/or reading the one or more sensor lines 130 corresponding with the prediction location of the subject's eyes. Outside that interval, the light sources 122 may be deactivated to improve energy efficiency or provide other peripheral benefits as discussed above. In block 326, the imaging device 100 determines whether to continue tracking the subject's eyes. If so, the method 300 returns to block 306 in which the imaging device 100 determines the location of the subject's eyes.

Figure 4:
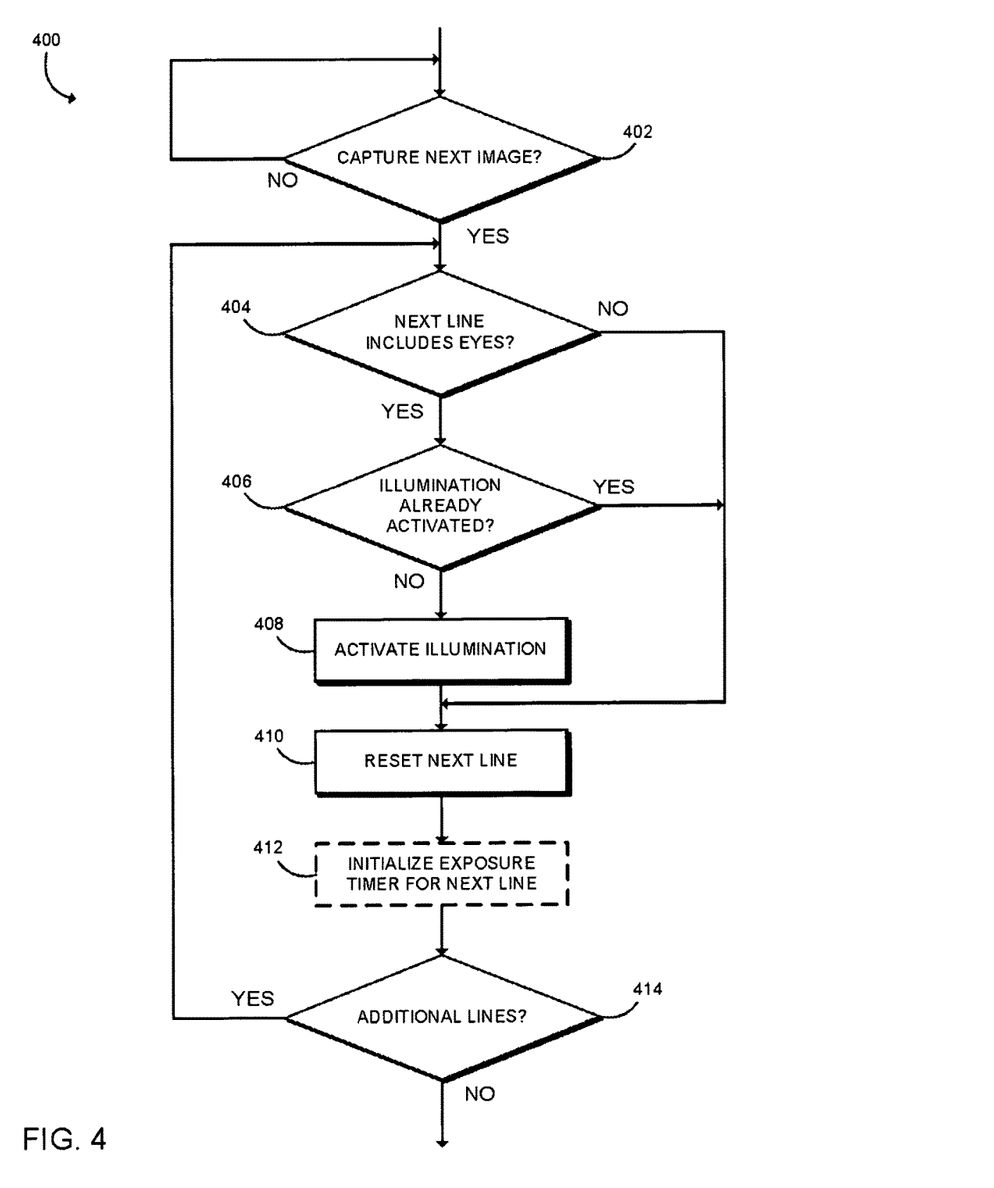
FIG. 4 is a simplified flow diagram of at least one embodiment of a method for resetting sensor lines with camera and light source synchronization on the imaging device of FIG. 1.

Referring now to FIG. 4, in use, the imaging device 100 may execute a method 400 for resetting sensor lines with camera and light source synchronization. It should be appreciated that the method 400 may be executed in parallel with the method 500 of FIG. 5 (discussed below) for reading sensor lines. The illustrative method 400 begins with block 402 in which the imaging device 100 determines whether to capture the next image. As discussed above, the camera 120 of the imaging device 100 may capture each image (e.g., of a video) using a rolling shutter mode. Accordingly, if the next image is to be captured, the imaging device 100 determines, in block 404, whether the next sensor line 130 includes the subject's eyes. As discussed above, in some embodiments, the imaging device 100 determines the set of sensor lines 130 corresponding with the predicted/estimated location of the subject's eyes. As such, the imaging device 100 may compare that set of sensor lines 130 with the next sensor line 130 to determine whether the next sensor line 130 includes a portion of the subject's eyes.

If so, the imaging device 100 determines, in block 406, whether the illumination (e.g., via the light sources 122) is already activated. In some embodiments, the illumination should only be already activated if the previously reset sensor line 130 includes the subject's eyes. If the illumination is not already activated, the imaging device 100 activates the illumination in block 408. That is, the imaging device 100 turns on the one or more light sources 122 to illuminate the subject's eyes. In block 410, the imaging device 100 resets the next sensor line 130 (i.e., with the camera 120). Additionally, if the imaging device 100 determines, in block 404, that the next sensor line 130 does not include the subject's eyes or, in block 406, that the illumination is already activated, the method 400 advances to block 410 in which the imaging device 100 resets the next sensor line. It should be appreciated that, in some embodiments, the imaging device 100 may activate the light sources 122 and reset the next sensor line 130 contemporaneously or in reverse order to that shown in FIG. 4 and described herein.

In block 412, the imaging device 100 may initialize an exposure timer for the next sensor line 130 (e.g., the first reset sensor line). In other embodiments, the imaging device 100 may receive a synchronization signal or other temporal data from the camera 120 regarding the resetting/reading schedule and/or other parameters of the camera 120 As discussed above, in the illustrative embodiment, each of the sensor lines 130 is exposed for the same amount of time on a rolling, sequential basis. In some embodiments, an exposure timer is set based on the exposure time established by the imaging device 100 or the camera 120 upon resetting the first sensor line. Expiration of the exposure timer indicates that the first sensor line 130 has reached the desired exposure time. Accordingly, in some embodiments, the camera 120 reads the first sensor line 130 after expiration of the exposure timer and, thereafter, consecutively reads the remaining sensor lines 130 in the order in which they have been reset (see FIG. 6). As such, it should be appreciated that a sensor line 130 being read at a particular time is one that was reset a certain time ago defined by the duration of the exposure time. In other embodiments, an exposure timer may be independently set for each sensor line 130. In block 414, the imaging device 100 determines whether there are any other sensor lines 130 in the next image that have not been reset. If so, the method 400 returns to block 404 in which the imaging device 100 determines whether the next sensor line 130 includes the subject's eyes. In other words, the imaging device 100 sequentially resets the sensor lines 130 of the camera 120 and activates or maintains illumination during periods of time in which the imaging device 100 is resetting sensor lines 130 corresponding with the location of the subject's eyes in the image.

Figure 5:
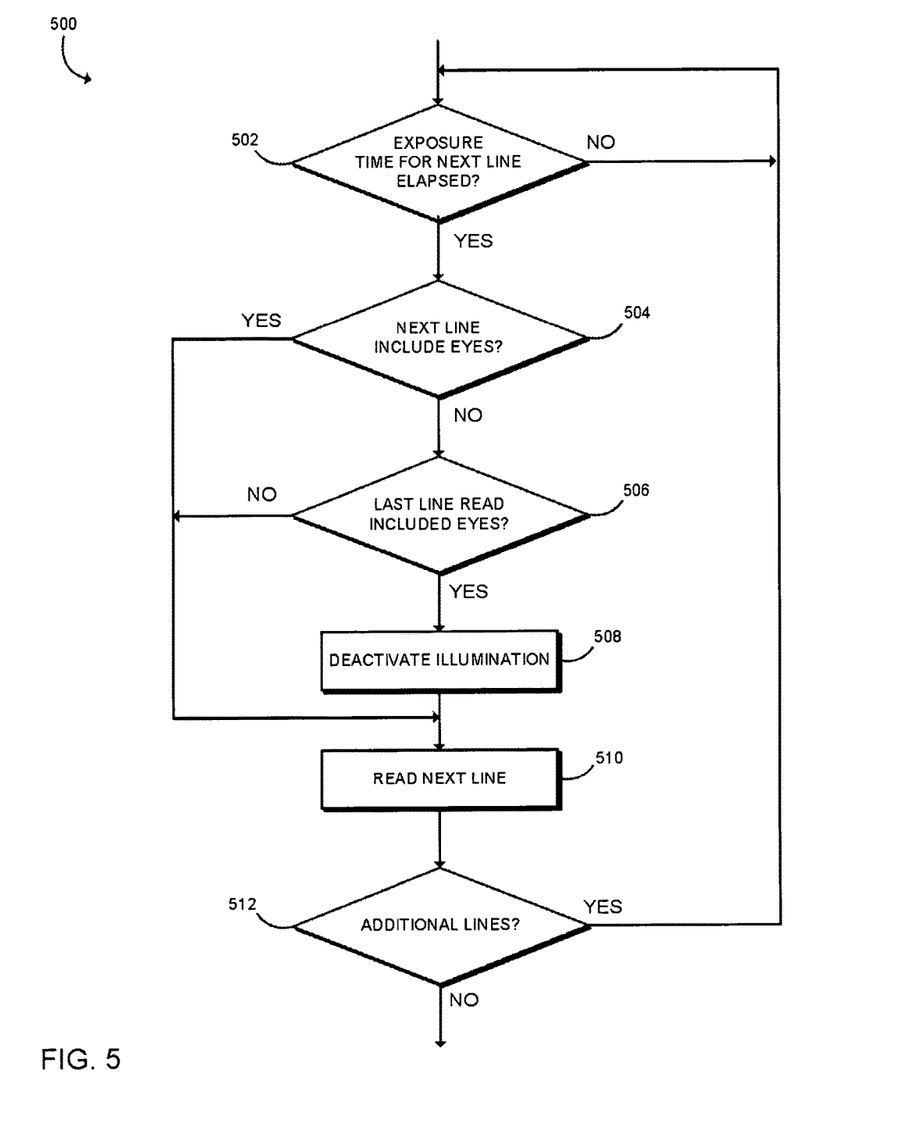
FIG. 5 is a simplified flow diagram of at least one embodiment of a method for reading sensor lines with camera and light source synchronization on the imaging device of FIG. 1.

Referring now to FIG. 5, in use, the imaging device 100 may execute a method 500 for reading sensor lines with camera and light source synchronization. As indicated above, the method 500 may be executed in parallel with the method 400 of FIG. 4. The illustrative method 500 begins with block 502 in which the imaging device 100 determines whether the exposure time for the next sensor line 130 has elapsed. As discussed above with regard to method 400 of FIG. 4, an exposure timer or synchronization signal may be utilized to determine when to read the first sensor line 130 and/or subsequent sensor lines.

If the next sensor line 130 has been exposed for the determined amount of time (i.e., the exposure time), the imaging device 100 determines whether the next sensor line 130 includes the subject's eyes in block 504. If not, the imaging device 100 determines, in block 506, whether the last sensor line 130 read (i.e., by the camera 120) included the subject's eyes. For example, suppose the sensor lines 130 are read sequentially such that, without loss of generality, line 1 is read first, line 2 is read second, line 3 is read third, and so on. Further, suppose that the next sensor line 130 to be read is line 2. In such an example, the imaging device 100 determines whether line 1, which has been previously read, included the subject's eyes. In some embodiments, the imaging device 100 does not analyze line 1 to make such a determination but, instead, relies on a previous estimation/prediction of the location of the subject's eyes as discussed above. For example, the imaging device 100 may compare the set of sensor lines 130 corresponding with the predicted/estimated location of the subject's eyes with line 1 (e.g., by comparing the line numbers/identifiers). Of course, once the image is captured in full or part, the imaging device 100 may analyze the captured image or portion thereof to determine the actual location of the subject's eyes in the image and predict the next location of the subject's eyes.

If the next sensor line 130 does not include the subject's eyes and the last sensor line 130 read included the subject's eyes, the imaging device 100 deactivates illumination in block 508. That is, the imaging device 100 turns off one or more of the light sources 122 activated in block 408 of FIG. 4. In block 510, the imaging device 100 reads the next sensor line 130 (i.e., with the camera 120). Additionally, if the imaging device 100 determines, in block 504, that the next sensor line 130 includes the subject's eyes or, in block 506, that the last sensor line 130 read does not include the subject's eyes, the method 500 advances to block 510 in which the imaging device 100 reads the next sensor line. It should be appreciated that, in some embodiments, the imaging device 100 may deactivate the light sources 122 and read the next sensor line contemporaneously or in reverse order to that shown in FIG. 5 and described herein. In other words, the light sources 122 may remain activated until the last sensor line 130 in the set of sensor lines 130 corresponding with the location of the subject's eyes has been read.

In block 512, the imaging device 100 determines whether there are any other sensor lines 130 in the next image that have not been read. If so, the method 500 returns to block 502 in which the imaging device 100 determines whether the exposure time for the next sensor line 130 has elapsed. As discussed above, in some embodiments, an exposure timer is monitored only prior to reading the first sensor line 130 and, subsequently, the sensor lines 130 may be read in the same order and frequency in which they were reset. In other words, the sensor lines 130 are reset and read at the same rate, but the reads are delayed by the exposure time (e.g., a static predetermined value) with respect to the resets.

Figure 6:
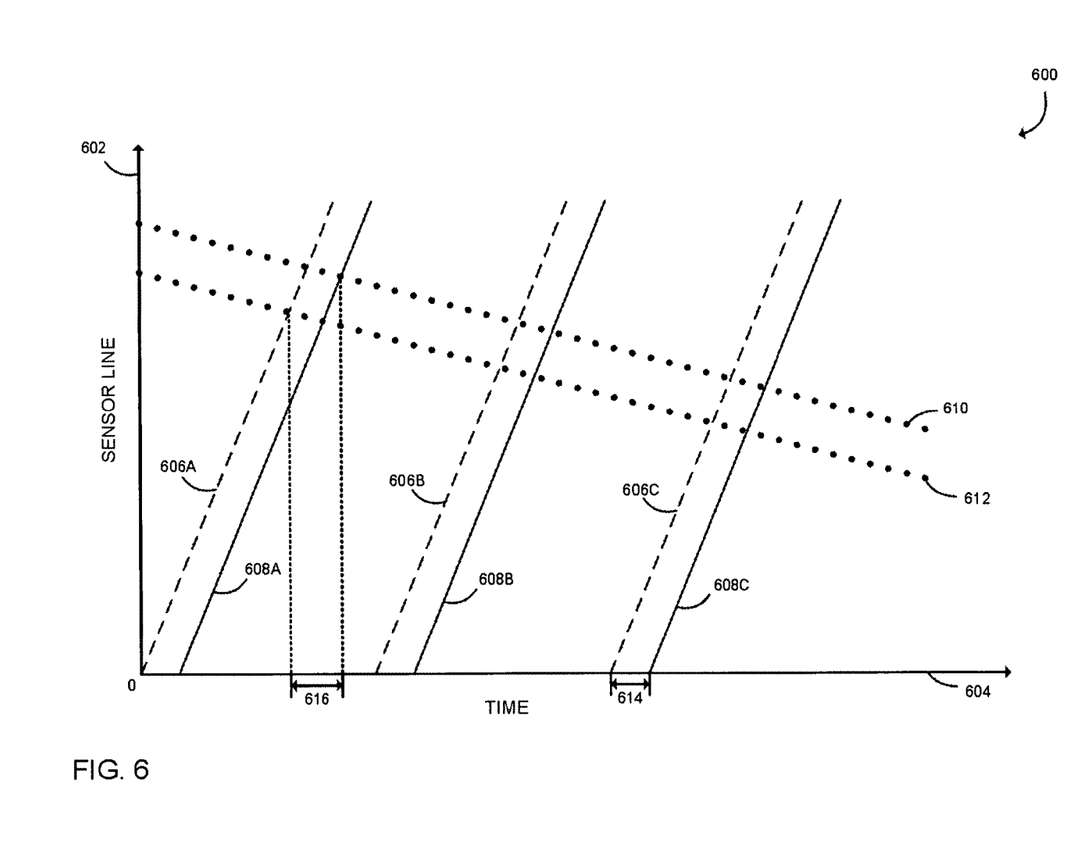
FIG. 6 is a simplified temporal graph of at least one embodiment of camera and light source synchronization on the imaging device of FIG. 1.

Referring now to FIG. 6, a simplified temporal graph 600 of an embodiment of camera and light source synchronization on the imaging device 100 is shown. In the illustrative embodiment, the temporal graph 600 shows the temporal arrangement and relationship between the resetting of sensor lines, reading of sensor lines, and illumination of objects. The temporal graph 600 shows a coordinate system including sensor line axis 602 and a time axis 604. Although the graph 600 is shown as a continuous analog system for simplicity, in some embodiments, there is a finite number of sensor lines 130 in the camera 120 (e.g., a digital camera). In the illustrative embodiment, reset times and read times for the sensor lines 130 of the camera 120 and associated with three consecutively captured images are shown. More specifically, the first image includes a reset time 606A and a read time 608A; a second image includes a reset time 606B and a read time 608B; and a third image includes a reset time 606C and a read time 608C.

The illustrative embodiment also shows a first boundary 610 and a second boundary 612 of the tracked object (e.g., a subject's eyes). In some embodiments, the boundaries 610, 612 denote boundaries of the predicted location of the object. As shown in the graph 600, the object moved toward sensor lines 130 having lower values as time goes on, which is described as being "lower" in the captured image without loss of generality. For example, the object is lower in the captured image corresponding with the read time 608C than in the captured image corresponding with the read time 608A. An exposure time 614 between the reset time 606C and the read time 608C is also shown for illustrative purposes. As discussed above, the exposure time is the interval during which a sensor line 130 is exposed and defined by the length of time between the reset time and the read time of the sensor line 130. It should be appreciated that, as discussed above and illustrated in FIG. 6, the exposure time is the same duration, albeit occurring at a different absolute time, for each sensor line 130 of each captured image. Further, the exposure time may be a predefined parameter of the camera 120 in some embodiments. In the illustrative embodiment, an illumination interval 616 for the capture of the image corresponding with the read time 608A is also shown. As discussed above and shown in FIG. 6, the illumination interval defines the period of time during which the camera 120 is to expose the set of sensor lines 130 corresponding with the predicted location of the tracked object.

Examples

Illustrative examples of the technologies disclosed herein are provided below. An embodiment of the technologies may include any one or more, and any combination of, the examples described below.

Example 1 includes an imaging device for camera and light source synchronization, the imaging device comprising an image processing module to detect a current location of an object in a captured image generated by the imaging device; a location prediction module to predict a next location of the object in a next captured image, generated by the imaging device, based on the current location of the object; and an illumination module to (i) determine an illumination interval defining a period of time during which a camera of the imaging device is to expose a set of sensor lines during the capture of the next captured image, wherein the set of sensor lines corresponds with the predicted next location of the object and (ii) activate a light source of the imaging device to illuminate the object throughout the determined illumination interval.

Example 2 includes the subject matter of Example 1, and wherein to detect the current location of the object comprises to detect a current location of a subject's eyes in the captured image.

Example 3 includes the subject matter of any of Examples 1 and 2, and wherein to detect the current location of the subject's eyes comprises to detect a current location of the subject's face in the captured image.

Example 4 includes the subject matter of any of Examples 1-3, and wherein to detect the current location of the object comprises to reduce a search area of the captured image based on a previously predicted location of the object.

Example 5 includes the subject matter of any of Examples 1-4, and wherein the location prediction module is to receive sensor data indicative of motion of the computing device or the object, wherein to predict the next location of the object comprises to predict a next location of the object in the next captured image based on the current location and the sensor data.

Example 6 includes the subject matter of any of Examples 1-5, and further including at least one sensor to generate the sensor data.

Example 7 includes the subject matter of any of Examples 1-6, and wherein to predict the next location of the object comprises to predict a next location of the object in the next captured image based on the current location and a previously detected location of the object in a previously captured image.

Example 8 includes the subject matter of any of Examples 1-7, and wherein the illumination module is to deactivate the light source during a period of time outside the determined illumination interval in which the camera is to expose the set of sensor lines of the next captured image.

Example 9 includes the subject matter of any of Examples 1-8, and further including an image capturing module to capture the next captured image with the camera of the imaging device.

Example 10 includes the subject matter of any of Examples 1-9, and wherein the camera is to capture the next captured image based on an electronic rolling shutter mode.

Example 11 includes the subject matter of any of Examples 1-10, and wherein the set of sensor lines corresponding with the predicted next location of the object comprises a single sensor line.

Example 12 includes the subject matter of any of Examples 1-11, and wherein the imaging device is one of a tablet computer, a laptop computer, or a cellular phone.

Example 13 includes the subject matter of any of Examples 1-12, and further including an image capturing module to sequentially reset each sensor line in the next captured image, wherein the illumination module is to activate the light source in response to a determination that (i) the next sensor line to be reset corresponds with the predicted next location of the object and (ii) the light source is not already activated.

Example 14 includes the subject matter of any of Examples 1-13, and wherein the image capturing module is to sequentially read each sensor line in the next captured image a predetermined exposure time after each sensor line is sequentially reset; and wherein the illumination module is to deactivate the light source in response to a determination that neither the next sensor line to be read nor the last sensor line read corresponds with the predicted next location of the object.

Example 15 includes the subject matter of any of Examples 1-14, and wherein the image processing module is to analyze the next captured image to identify illuminated sensor lines indicative of the sensor lines illuminated during the capture of the next captured image; and wherein the illumination module is to adjust the illumination interval based on the analysis of the image processing module.

Example 16 includes a method for camera and light source synchronization on an imaging device, the method comprising detecting, by the imaging device, a current location of an object in a captured image generated by the imaging device; predicting, by the imaging device, a next location of the object in a next captured image, generated by the imaging device, based on the current location of the object; determining, by the imaging device, an illumination interval defining a period of time during which a camera of the imaging device is to expose a set of sensor lines during the capturing of the next captured image, the set of sensor lines corresponding with the predicted next location of the object; and activate, by the imaging device, a light source of the imaging device to illuminate the object during the determined illumination interval.

Example 17 includes the subject matter of Example 16, and wherein detecting the current location of the object comprises detecting a current location of the subject's eyes in the captured image.

Example 18 includes the subject matter of any of Example 16 and 17, and wherein detecting the current location of the subject's eyes comprises detecting a current location of the subject's face in the captured image.

Example 19 includes the subject matter of any of Example 16-18, and wherein detecting the current location of the object comprises reducing a search area of the captured image based on a previously predicted location of the object.

Example 20 includes the subject matter of any of Example 16-19, and further including receiving, with the imaging device, sensor data indicating any motion of the imaging device or the object, wherein predicting the next location of the object comprises predicting a next location of the object in the next captured image based on the current location and the sensor data.

Example 21 includes the subject matter of any of Example 16-20, and wherein predicting the next location of the object comprises predicting a next location of the object in the next captured image based on the current location and a previously detected location of the object in a previously captured image.

Example 22 includes the subject matter of any of Example 16-21, and further including deactivating, by the imaging device, the light source during a period of time outside the determined illumination interval in which the camera is to expose the set of sensor lines of the next captured image.

Example 23 includes the subject matter of any of Example 16-22, and further including capturing, by the camera of the imaging device, the next captured image.

Example 24 includes the subject matter of any of Example 16-23, and wherein capturing the next captured image comprises using an electronic rolling shutter of the camera.

Example 25 includes the subject matter of any of Example 16-24, and wherein the set of sensor lines corresponding with the predicted next location of the object comprises a single sensor line.

Example 26 includes the subject matter of any of Example 16-25, and wherein the imaging device is one of a tablet computer, a laptop computer, or a cellular phone.

Example 27 includes the subject matter of any of Example 16-26, and further including resetting, sequentially by the imaging device, each sensor line in the next captured image; and activating, by the imaging device, the light source in response to determining that (i) the next sensor line to be reset corresponds with the predicted next location of the object and (ii) the light source is not already activated.

Example 28 includes the subject matter of any of Example 16-27, and further including reading, sequentially by the imaging device, each sensor line in the next captured image a predetermined exposure time after each sensor line is sequentially reset; and deactivating, by the imaging device, the light source in response to determining that neither the next sensor line to be read nor the last sensor line read corresponds with the predicted next location of the object.

Example 29 includes the subject matter of any of Example 16-28, and further including analyzing, by the imaging device, the next captured image to identify illuminated sensor lines indicative of the sensor lines illuminated during the capture of the next captured image; and adjusting, by the imaging device, the illumination interval based on the analysis of the next captured image.

Example 30 includes a computing device comprising a processor; and a memory having stored therein a plurality of instructions that when executed by the processor cause the computing device to perform the method of any of Examples 16-29.

Example 31 includes one or more machine-readable storage media comprising a plurality of instructions stored thereon that, in response to being executed, result in a computing device performing the method of any of Examples 16-29.

Example 32 includes a computing device for camera and light source synchronization, the computing device comprising means for detecting a current location of an object in a captured image generated by the computing device; means for predicting a next location of the object in a next captured image, generated by the computing device, based on the current location of the object; means for determining an illumination interval defining a period of time during which a camera of the computing device is to expose a set of sensor lines during the capturing of the next captured image, the set of sensor lines corresponding with the predicted next location of the object; and means for activating a light source of the computing device to illuminate the object during the determined illumination interval.

Example 33 includes the subject matter of Example 32, and wherein the means for detecting the current location of the object comprises means for detecting a current location of the subject's eyes in the captured image.

Example 34 includes the subject matter of any of Examples 32 and 33, and wherein the means for detecting the current location of the subject's eyes comprises means for detecting a current location of the subject's face in the captured image.

Example 35 includes the subject matter of any of Examples 32-34, and wherein the means for detecting the current location of the object comprises means for reducing a search area of the captured image based on a previously predicted location of the object.

Example 36 includes the subject matter of any of Examples 32-35, and further including means for receiving sensor data indicating any motion of the computing device or the object, wherein the means for predicting the next location of the object comprises means for predicting a next location of the object in the next captured image based on the current location and the sensor data.

Example 37 includes the subject matter of any of Examples 32-36, and wherein the means for predicting the next location of the object comprises means for predicting a next location of the object in the next captured image based on the current location and a previously detected location of the object in a previously captured image.

Example 38 includes the subject matter of any of Examples 32-37, and further including means for deactivating the light source during a period of time outside the determined illumination interval in which the camera is to expose the set of sensor lines of the next captured image.

Example 39 includes the subject matter of any of Examples 32-38, and further including means for capturing, by the camera of the computing device, the next captured image.

Example 40 includes the subject matter of any of Examples 32-39, and wherein the means for capturing the next captured image comprises means for using an electronic rolling shutter of the camera.

Example 41 includes the subject matter of any of Examples 32-40, and wherein the set of sensor lines corresponding with the predicted next location of the object comprises a single sensor line.

Example 42 includes the subject matter of any of Examples 32-41, and wherein the computing device is one of a tablet computer, a laptop computer, or a cellular phone.

Example 43 includes the subject matter of any of Examples 32-42, and further including means for resetting, sequentially by the computing device, each sensor line in the next captured image; and means for activating the light source in response to a determination that (i) the next sensor line to be reset corresponds with the predicted next location of the object and (ii) the light source is not already activated.

Example 44 includes the subject matter of any of Examples 32-43, and further including means for reading, sequentially by the computing device, each sensor line in the next captured image a predetermined exposure time after each sensor line is sequentially reset; and means for deactivating the light source in response to a determination that neither the next sensor line to be read nor the last sensor line read corresponds with the predicted next location of the object.

Example 45 includes the subject matter of any of Examples 32-44, and further including means for analyzing the next captured image to identify illuminated sensor lines indicative of the sensor lines illuminated during the capture of the next captured image; and means for adjusting the illumination interval based on the analysis of the next captured image.

The invention claimed is:

1. An imaging device for camera and light source synchronization, the imaging device comprising:
   an image processing module to detect a current location of an object in a captured image generated by the imaging device;
   a location prediction module to predict a next location of the object in a next captured image, generated by the imaging device, based on (i) the current location of the object and (ii) historical data that identifies previously detected locations of the object in corresponding previously captured images generated by the imaging device; and
   an illumination module to (i) determine an illumination interval defining a period of time during which a light source of the imaging device is to illuminate a set of sensor lines of the imaging device during the capture of the next captured image based on the predicted next location of the object, wherein the set of sensor lines corresponds with the predicted next location of the object and (ii) activate the light source of the imaging device to illuminate only the set of sensor lines of the imaging device that was determined to correspond to the predicted next location of the object throughout the determined illumination interval, wherein to active the light source comprises to sequentially expose each sensor line of the set of sensor lines of the imaging device to capture the next captured image.

2. The imaging device of claim 1, wherein to detect the current location of the object comprises to detect a current location of a subject's eyes in the captured image.

3. The imaging device of claim 1, wherein to detect the current location of the object comprises to reduce a search area of the captured image based on a previously predicted location of the object.

4. The imaging device of claim 1, wherein the location prediction module is to receive sensor data indicative of motion of the computing device or the object,
    wherein to predict the next location of the object comprises to predict a next location of the object in the next captured image based on the current location and the sensor data.

5. The imaging device of claim 1, wherein to predict the next location of the object comprises to predict a next location of the object in the next captured image based on the current location and a previously detected location of the object in a previously captured image.

6. The imaging device of claim 1, wherein the illumination module is to deactivate the light source during a period of time outside the determined illumination interval in which the camera is to expose the set of sensor lines of the next captured image.

7. The imaging device of claim 1, further comprising an image capturing module to capture the next captured image with the camera of the imaging device,
    wherein the camera is to capture the next captured image based on an electronic rolling shutter mode.

8. The imaging device of claim 1, wherein the imaging device is one of a tablet computer, a laptop computer, or a cellular phone.

9. The imaging device of claim 1, further comprising an image capturing module to sequentially reset each sensor line in the next captured image,
    wherein the illumination module is to activate the light source in response to a determination that (i) the next sensor line to be reset corresponds with the predicted next location of the object and (ii) the light source is not already activated.

10. The imaging device of claim 9, wherein the image capturing module is to sequentially read each sensor line in the next captured image a predetermined exposure time after each sensor line is sequentially reset; and
    wherein the illumination module is to deactivate the light source in response to a determination that neither the next sensor line to be read nor the last sensor line read corresponds with the predicted next location of the object.

11. The imaging device of claim 1, wherein the image processing module is to analyze the next captured image to identify illuminated sensor lines indicative of the sensor lines illuminated during the capture of the next captured image; and
    wherein the illumination module is to adjust the illumination interval based on the analysis of the image processing module.

12. One or more non-transitory, machine-readable storage media comprising a plurality of instructions stored thereon that, in response to execution by an imaging device, cause the imaging device to:
    detect a current location of an object in a captured image generated by the imaging device;
    predict a next location of the object in a next captured image, generated by the imaging device, based on (i) the current location of the object and (ii) historical data that identifies previously detected locations of the object in corresponding previously captured images generated by the imaging device;
    determine an illumination interval defining a period of time during which a light source of the imaging device is to illuminate a set of sensor lines of the imaging device during the capturing of the next captured image based on the predicted next location of the object, the set of sensor lines corresponding with the predicted next location of the object; and
    activate the light source of the imaging device to illuminate only the set of sensor lines of the imaging device that was determined to correspond to the predicted next location of the object during the determined illumination interval, wherein to active the light source comprises to sequentially expose each sensor line of the set of sensor lines of the imaging device to capture the next captured image.

13. The one or more non-transitory, machine-readable storage media of claim 12, wherein to detect the current location of the object comprises to detect a current location of the subject's eyes in the captured image.

14. The one or more non-transitory, machine-readable storage media of claim 13, wherein to detect the current location of the subject's eyes comprises to detect a current location of the subject's face in the captured image.

15. The one or more non-transitory, machine-readable storage media of claim 12, wherein to detect the current location of the object comprises to reduce a search area of the captured image based on a previously predicted location of the object.

16. The one or more non-transitory, machine-readable storage media of claim 12, wherein the plurality of instructions further cause the imaging device to receive sensor data that indicates any motion of the imaging device or the object,
    wherein to predict the next location of the object comprises to predict a next location of the object in the next captured image based on the current location and the sensor data.

17. The one or more non-transitory, machine-readable storage media of claim 12, wherein to predict the next location of the object comprises to predict a next location of the object in the next captured image based on the current location and a previously detected location of the object in a previously captured image.

18. The one or more non-transitory, machine-readable storage media of claim 12, wherein the plurality of instructions further cause the imaging device to deactivate the light source during a period of time outside the determined illumination interval in which the camera is to expose the set of sensor lines of the next captured image.

19. The one or more non-transitory, machine-readable storage media of claim 12, wherein the plurality of instructions further cause the imaging device to:
    reset, sequentially, each sensor line in the next captured image; and
    activate the light source in response to a determination that (i) the next sensor line to be reset corresponds with the predicted next location of the object and (ii) the light source is not already activated.

20. The one or more non-transitory, machine-readable storage media of claim 19, wherein the plurality of instructions further cause the imaging device to:
    read, sequentially, each sensor line in the next captured image a predetermined exposure time after each sensor line is sequentially reset; and
    deactivate the light source in response to a determination that neither the next sensor line to be read nor the last sensor line read corresponds with the predicted next location of the object.

21. The one or more non-transitory, machine-readable storage media of claim 12, wherein the plurality of instructions further cause the imaging device to:

analyze the next captured image to identify illuminated sensor lines indicative of the sensor lines illuminated during the capture of the next captured image; and adjust the illumination interval based on the analysis of the next captured image.

22. A method for camera and light source synchronization on an imaging device, the method comprising:

detecting, by the imaging device, a current location of an object in a captured image generated by the imaging device;

predicting, by the imaging device, a next location of the object in a next captured image, generated by the imaging device, based on (i) the current location of the object and (ii) historical data that identifies previously detected locations of the object in corresponding previously captured images generated by the imaging device;

determining, by the imaging device, an illumination interval defining a period of time during which a light source of the imaging device is to illuminate a set of sensor lines of the imaging device during the capturing of the next captured image based on the predicted next location of the object, the set of sensor lines corresponding with the predicted next location of the object; and activating, by the imaging device, a light source of the imaging device to illuminate only the set of sensor lines of the imaging device that was determined to correspond to the predicted next location of the object during the determined illumination interval, wherein activating the light source comprises sequentially exposing each sensor line of the set of sensor lines of the imaging device to capture the next captured image.

23. The method of claim 22, further comprising:

resetting, sequentially by the imaging device, each sensor line in the next captured image; and activating, by the imaging device, the light source in response to determining that (i) the next sensor line to be reset corresponds with the predicted next location of the object and (ii) the light source is not already activated.

24. The method of claim 23, further comprising:

reading, sequentially by the imaging device, each sensor line in the next captured image a predetermined exposure time after each sensor line is sequentially reset; and deactivating, by the imaging device, the light source in response to determining that neither the next sensor line to be read nor the last sensor line read corresponds with the predicted next location of the object.

25. The method of claim 22, further comprising:

analyzing, by the imaging device, the next captured image to identify illuminated sensor lines indicative of the sensor lines illuminated during the capture of the next captured image; and adjusting, by the imaging device, the illumination interval based on the analysis of the next captured image.

* * * * *